United States Patent
Yamamoto et al.

(10) Patent No.: US 11,512,380 B2
(45) Date of Patent: Nov. 29, 2022

(54) METHOD AND DEVICE FOR MANUFACTURING BLACK COATED STEEL SHEETS

(71) Applicant: NIPPON STEEL NISSHIN CO., LTD., Tokyo (JP)

(72) Inventors: Masaki Yamamoto, Tokyo (JP); Tadashi Nakano, Tokyo (JP); Ichiro Takahashi, Tokyo (JP); Hiroyuki Nakamizo, Tokyo (JP); Toshiaki Sato, Tokyo (JP); Yoshinobu Kurisu, Tokyo (JP); Yuuki Sakuraba, Tokyo (JP); Yoshitaka Yukura, Hiroshima (JP); Tsutomu Ohta, Hiroshima (JP); Shinichi Kajimoto, Hiroshima (JP); Noboru Suzuki, Fukuoka (JP); Masahiko Tsuchiyama, Fukuoka (JP); Yuusuke Murai, Fukuoka (JP)

(73) Assignee: NIPPON STEEL NISSHIN CO., LTD., Tokyo (JP)

( * ) Notice: Subject to any disclaimer, the term of this patent is extended or adjusted under 35 U.S.C. 154(b) by 713 days.

(21) Appl. No.: 16/478,851

(22) PCT Filed: Jan. 17, 2018

(86) PCT No.: PCT/JP2018/001153
§ 371 (c)(1),
(2) Date: Jul. 18, 2019

(87) PCT Pub. No.: WO2018/135518
PCT Pub. Date: Jul. 26, 2018

(65) Prior Publication Data
US 2020/0190654 A1    Jun. 18, 2020

(30) Foreign Application Priority Data

Jan. 18, 2017 (JP) .............................. JP2017-006606

(51) Int. Cl.
*C23C 8/16* (2006.01)
*C23C 30/00* (2006.01)
(Continued)

(52) U.S. Cl.
CPC ................. *C23C 8/16* (2013.01); *C22C 18/04* (2013.01); *C22C 21/10* (2013.01); *C22C 23/04* (2013.01);
(Continued)

(58) Field of Classification Search
None
See application file for complete search history.

(56) References Cited

U.S. PATENT DOCUMENTS

2015/0083276 A1* 3/2015 Nakano ................... C23C 22/05
                                                              148/284
2019/0062889 A1* 2/2019 Nakano ................... C22C 21/10

FOREIGN PATENT DOCUMENTS

CN    104246014 A    12/2014
EP       2843081 A1    3/2015
(Continued)

OTHER PUBLICATIONS

Taiwan Patent Office, Office action dated Dec. 16, 2020.
(Continued)

*Primary Examiner* — Brian D Walck
(74) *Attorney, Agent, or Firm* — Li & Cai Intellectual Property Office

(57) ABSTRACT

The present invention provides a method for manufacturing more beautiful black coated steel sheets by uniformly blackening the coating layer. Specifically, the present invention provides a method for manufacturing black coated steel sheets, which brings Zn—Al—Mg alloy coated steel sheets (1) into contact with steam in a closed container (10), wherein said closed container (10) can maintain a predefined
(Continued)

internal pressure through variable control of the amount of steam flowing into said closed container (10) and/or the amount of steam flowing out of said closed container (10), and in said closed container (10) that can maintain said predefined pressure, said Zn—Al—Mg alloy coated steel sheets (1) have contact with the steam introduced into said closed container (10).

2 Claims, 3 Drawing Sheets

(51) Int. Cl.
    *C23C 2/06*     (2006.01)
    *C22C 21/10*     (2006.01)
    *C23C 2/26*     (2006.01)
    *C22C 23/04*     (2006.01)
    *C22C 18/04*     (2006.01)

(52) U.S. Cl.
    CPC ................. *C23C 2/06* (2013.01); *C23C 2/26* (2013.01); *C23C 30/005* (2013.01); *C23C 2222/00* (2013.01); *Y10T 428/31678* (2015.04)

(56) References Cited

FOREIGN PATENT DOCUMENTS

| | | |
|---|---|---|
| EP | 3425081 A1 | 1/2019 |
| JP | 2012-240371 A | 12/2012 |
| JP | 5335159 B1 | 11/2013 |
| JP | 2013-241676 A | 12/2013 |
| KR | 1020150002669 A | 1/2015 |

OTHER PUBLICATIONS

European Patent Office, Patent Search Report dated Aug. 10, 2020.
China Patent Office, Office action dated Jan. 13, 2021.
Korea Patent Office, Office action dated Feb. 1, 2021.

\* cited by examiner

METHOD AND DEVICE FOR MANUFACTURING BLACK COATED STEEL SHEETS

BACKGROUND OF THE INVENTION

1. Field of the Invention

The present invention relates to a method and a device for manufacturing black coated steel sheets.

2. Description of Related Art

The need for black steel sheets is increasing with design awareness in a number of fields, including roofing and exterior materials for buildings, home appliances and automobiles. The surface of steel sheets can be blackened by applying black paint to the surface and forming a black paint film thereon. The surface of steel sheets can also be blackened without forming a black paint film, specifically, by blackening the coating layer itself through oxidation, blocking the metallic gloss and silver-white tone of the coated steel sheets. For example, in patent document 1, zinc-aluminum-magnesium (Zn—Al—Mg) alloy coated steel sheets have contact with steam in a closed container to form a black oxide film in the Zn—Al—Mg alloy coating layer.

In patent document 2, coated steel sheets have contact with steam, with spacers positioned between the coated steel sheets, which allows more uniform blackening of the coating layer surface because the central and peripheral parts of the coated steel sheets have contact with steam in the same way.

In this specification, Zn—Al—Mg alloy coated steel sheets may be referred to as "coated steel sheets," and the Zn—Al—Mg alloy coating layer as "the coating layer." In addition, the treatment, in which Zn—Al—Mg alloy coated steel sheets have contact with steam in a closed container to blacken the Zn—Al—Mg alloy coating layer, may be referred to as "steam treatment."

CITATION LIST

Patent Literature

Patent document 1 Japanese Patent No. 5335159
Patent document 2 Japanese Unexamined Patent Application Publication No. 2013-241676

SUMMARY OF THE INVENTION

Technical Problem

As mentioned above, for more uniform blackening of the coating layer, it is essential that the whole area of the coated steel sheets to be blackened receive a sufficient supply of steam so that the coating layer surface has uniform contact with the steam.

However, the conventional methods described above have a problem with steam treatment in manufacturing black coated steel sheets: the obtained black coated steel sheets sometimes do not have a uniform appearance. The probable cause of this non-uniform problem, based on various examinations, is that the coated steel sheets to be blackened in a closed container do not receive a sufficient supply of steam during steam treatment.

The present invention provides a method for manufacturing more beautiful black coated steel sheets by uniformly blackening the coating layer.

Solution to Problem (1) The present invention provides a method for manufacturing black coated steel sheets, which brings Zn—Al—Mg alloy coated steel sheets into contact with steam in a closed container, wherein said closed container can maintain a predefined internal pressure through variable control of the amount of steam flowing into said closed container and/or the amount of steam flowing out of said closed container, and in said closed container that can maintain said predefined pressure, said Zn—Al—Mg alloy coated steel sheets have contact with the steam introduced into said closed container.

(2) The present invention provides the method for manufacturing black coated steel sheets according to (1), wherein said predefined pressure equals 80% to 120% of the specified internal pressure for said closed container.

(3) The present invention provides a device for manufacturing black coated steel sheets, which brings Zn—Al—Mg alloy coated steel sheets into contact with steam in a closed container, wherein said device comprises a closed container that can contain said Zn—Al—Mg alloy coated steel sheets, and a pressure control means that can maintain a predefined internal pressure of said closed container by variably controlling the amount of steam flowing into said closed container and/or the amount of steam flowing out of said closed container, and in said closed container that can maintain said predefined pressure with the help of said pressure control means, said Zn—Al—Mg alloy coated steel sheets have contact with the steam introduced into said closed container.

(4) The present invention provides the device for manufacturing black coated steel sheets according to (3), wherein said predefined pressure equals 80% to 120% of the specified internal pressure for said closed container.

In construction (1) or (3), when Zn—Al—Mg alloy coated steel sheets have contact with steam in the closed container for blackening, steam flows into the closed container through the inlet and flows out of the closed container through the outlet, thus appropriately discharging the hydrogen gas generated in the blackening reaction with steam while securing the necessary amount of steam in the closed container. The closed container can maintain a predefined internal pressure through variable control of the amount of steam flowing into the closed container and/or the amount of steam flowing out of the closed container.

In construction (2) or (4), depending on the condition of the steam treatment for coated steel sheets in the closed container, the internal pressure of the closed container is appropriately controlled in a range of 80% to 120% of the specified internal pressure for the closed container during steam treatment, thus allowing manufacturing of high-quality black coated steel sheets.

Advantageous Effects of Invention

The method according to the present invention allows manufacturing high-quality black coated steel sheets with a good appearance.

DETAILED DESCRIPTION OF THE PREFERRED EMBODIMENTS

Method for Manufacturing Black Coated Steel Sheets

The method for manufacturing black coated steel sheets according to the present invention brings Zn—Al—Mg alloy coated steel sheets into contact with steam in a closed container to manufacture black coated steel sheets.

Figure 1:
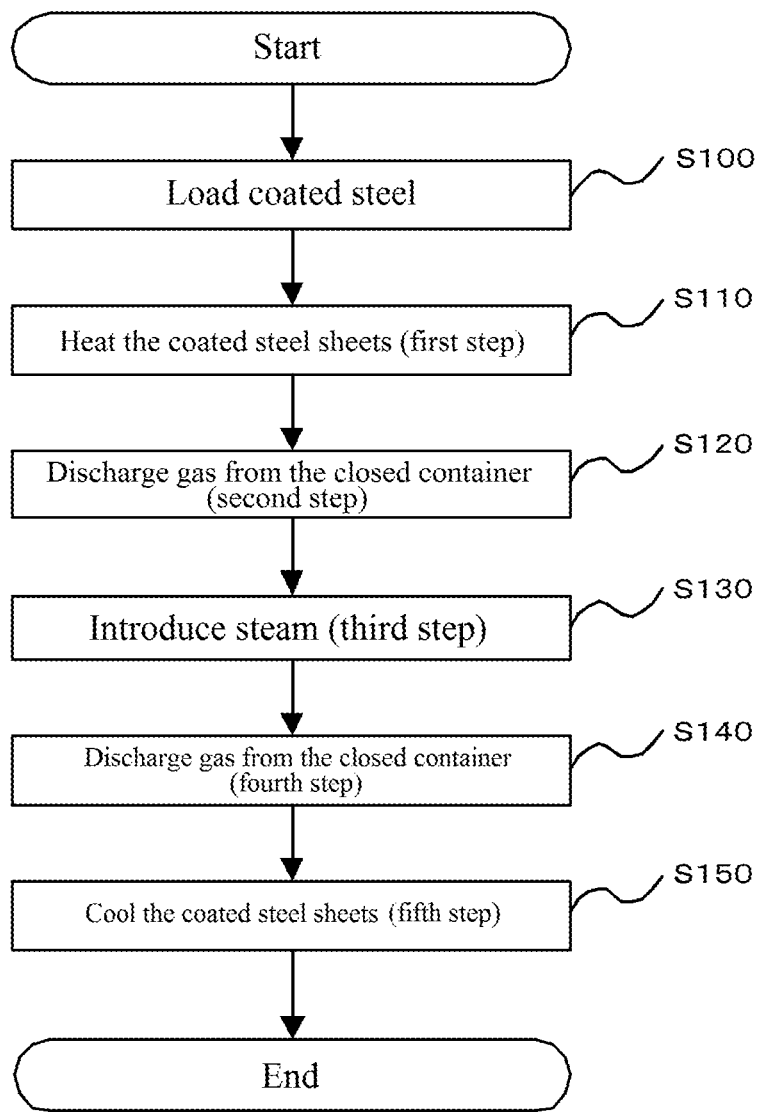
FIG. 1 is a flow chart of the method for manufacturing black coated steel sheets according to the present invention.

As shown in the flow chart in FIG. 1, the method according to the present invention involves five steps: first step (S110)—heating Zn—Al—Mg alloy coated steel sheets placed in a closed container; second step (S120)—discharging atmospheric gas from the closed container and thus bringing the gas pressure in the closed container to 70 kPa or less; third step (S130)—introducing steam into the closed container and blackening the coating layer under a predefined pressure; fourth step (S140)—returning the internal pressure of the closed container to the outside air pressure level and then bringing the gas pressure in the closed container to 70 kPa or less again; and fifth step (S150)—cooling the coated steel sheets in the closed container. "Atmospheric gas" means the gas that is present in the closed container. More specifically, atmospheric gas is a general term indicating outside air, steam, hydrogen-containing steam, nitrogen gas and so forth.

Below is a detailed description of the respective steps.

First Step

The first step (S110) heats the coated steel sheets placed in the closed container.

The closed container (10) contains a placement part (12) for placing the coated steel sheets (1), and has strength sufficient to withstand the pressure increase and decrease inside the closed container (10) caused by introducing steam and discharging atmospheric gas as well as heating and cooling. The container (10) can be in a closed state to substantially block the inflow of gas from outside or in an open state to receive coated steel sheets from outside. The wall or bottom surface of the closed container (10) is provided with openings for connecting a gas discharge pipe (31), a steam supply pipe (41), a gas introduction pipe (51), a drain pipe (35) and so forth, as described later. These pipes have valves. When the valves are shut, the container (10) is in a closed state. In addition, the exterior wall surface of the closed container (10) can be provided with temperature regulation mechanisms (20, 21) that heat or cool the closed container (10) for temperature regulation.

The coated steel sheets (1) have a substrate steel sheet, and a Zn—Al—Mg alloy coating layer formed on the surface of the substrate steel sheet.

There are no special restrictions on the type of the substrate steel sheet. For example, the substrate steel sheet may be of low carbon steel, medium carbon steel, high carbon steel or alloy steel. If good press formability is required, deep drawing steel sheets, for example, sheets of low carbon steel with Ti or Nb added, are preferable as substrate steel sheets. High-strength steel sheets containing P, Si, Mn or the like are also possible.

The Zn—Al—Mg alloy coating layer should have a composition that provokes blackening when the coating layer is in contact with steam. The mechanism through which the coating layer in contact with steam blackens is unclear. One hypothesis is that contact with steam produces oxides (e.g., $ZnO_{1-x}$) and hydroxides of Zn, Al and Mg that have a defective structure lacking oxygen on the surface and in the inside of the coating layer. The defect levels of the produced oxygen-deficient oxides and hydroxides trap light, which results in the black appearance of those oxides and hydroxides. For example, Zn—Al—Mg alloy coating layers containing 0.1 to 60 wt % of Al and 0.01 to 10 wt % of Mg, when in contact with steam, suitably blacken.

The most common Zn—Al—Mg alloy coated steel sheets in the market have coating layers containing approximately 6 wt % of Al and approximately 3 wt % of Mg. The metal texture of such a coat is an Al—Zn—$Zn_2$Mg ternary eutectic texture with primary Al phase, or primary Al phase and Zn single phase, mixed in the base material, and the coating layer suitably blackens through steam treatment. The respective phases (Al phase, Zn phase and $Zn_2$Mg phase) have irregular sizes and forms, and these phases are intermingled. The primary Al phase and the Al phase in the Al—Zn—$Zn_2$Mg ternary eutectic texture derive from the Al" phase at high temperature in the Al—Zn—Mg ternary equilibrium diagram (this phase is Al solid solution dissolving Zn and containing a small amount of Mg). At ordinary temperature instead of high temperature, the Al" phase is usually separated into fine Al phase and fine Zn phase. The Zn phase in the ternary eutectic texture is Zn solid solution dissolving a small amount of Al and, possibly, Mg. The $Zn_2$Mg phase in the ternary eutectic texture is an intermetallic compound phase with approximately 84 wt % of Zn in the Zn—Mg binary equilibrium diagram.

The Al—Zn—$Zn_2$Mg ternary eutectic texture with primary Al phase, or primary Al phase and Zn single phase, mixed in the base material is not the only coating layer that suitably blackens when in contact with steam. The primary phase can be of Zn or an intermetallic compound derived from other elements, for example Si, contained in the coating layer. In addition, the Al—Zn—$Zn_2$Mg ternary eutectic texture can be replaced by intermetallic compounds such as $Zn_2$Mg and $Zn_{11}Mg_2$. When in contact with steam, these intermetallic compounds also produce oxides and hydroxides of Zn, Al and Mg that have a defective structure lacking oxygen on the surface and in the inside of the coating layer, and the defect levels of the produced oxygen-deficient oxides and hydroxides trap light, which results in the black appearance of those oxides and hydroxides.

There are no special restrictions on the thickness of the coating layer. The thickness is preferably 3 to 100 μm. If the thickness of the coating layer is 3 μm or more, the handling of the coated steel sheets (1) is less likely to leave scars reaching the substrate steel sheet. That is, the coated steel sheets (1) improve in retention of the black appearance as well as corrosion resistance. At the same time, if the thickness of the coating layer is 100 μm or less, the coating layer and the substrate steel sheet are less likely to separate from each other in the processed part due to the difference in ductility between the coating layer and the substrate steel sheet during compression.

There are no special restrictions on the form of the coated steel sheets (1) if the coating layer in the area to be blackened can have contact with steam. For example, the coated steel sheets (1) can have a flat coating layer (e.g., plate form) or a curved coating layer (e.g., coil form). "Coil form" means that the coated steel sheets (1) are rolled with intervals in the radial direction. The coated steel sheets (1) are preferably in coil form because such steel sheets can be easily placed in the container (10) and easily carried before and after the process. If the coated steel sheets (1) are in coil form, each interval in the radial direction, specifically the shortest distance between adjacent surfaces, is preferably 0.05 mm or more to facilitate the infiltration of steam.

Spacers can be placed between the surfaces of the coated steel sheets (1) rolled into coil form to maintain the aforementioned intervals. The spacers should have a form such that the surface coating layers of the coated steel sheets (1) in coil form receive a sufficient supply of steam. For example, the spacers can be either linear or planar. Linear spacers are placed in a partial area on the surface of the coated steel sheets (1), and planar spacers are placed in a partial or the whole area on the surface of the coated steel sheets (1). The contact area between the spacers and the surface of the coated steel sheets (1) is preferably small, specifically 15 $mm^2$ or less, at each contact point. There are no special restrictions on the material of the spacers if the material does not significantly deteriorate, ignite, fuse with the coated steel sheets, or dissolve during steam treatment. The material of the spacers is preferably metal or resin. More preferably, the material is permeable to steam.

If a part of the surface of the coated steel sheets (1) needs to be left unblackened by design, this part can be masked with aluminum tape or resin tape.

The placement of the coated steel sheets (1) in the closed container (10) can be made in a single layer or a stack of layers. For example, the described coated steel sheets (1) in coil form can be placed in an "eye to the sky" orientation. If two or more coated steel sheets (1) in coil form are to be blackened at the same time, they can be stacked in an "eye to the sky" orientation in the closed container (10). Adjacent coated steel sheets preferably have the aforementioned intervals of 0.05 mm or more between them, for example, by placing spacers, to facilitate the infiltration of steam. Furthermore, the coated steel sheets (1) to be blackened in the closed container (10) may have any processed form. The coated steel sheets (1) in any processed form can be placed on or hung from a shelf installed in the closed container (10).

In the first step (S110), the coated steel sheets (1) are heated in the presence of gas (low-steam gas) whose dew point is lower than the temperature of the coated steel sheets (1) at all times. Thus, the atmospheric gas that is present in the closed container (10) is low-steam gas. The low-steam gas can be outside air to facilitate the heating of the coated steel sheets (1), but it can also be inert gas such as nitrogen, if the coated steel sheets (1) can be blackened, or atmosphere whose dew point is lower than that of outside air. The low-steam gas can be introduced into the closed container (10) through a gas introduction part (50) connected to the closed container (10). "Low-steam gas" in this specification means gas whose dew point is lower than the temperature of the coated steel sheets (1).

Usually, the coated steel sheets (1) are at ordinary temperature before heating, and have a large heat capacity. Therefore, if the coated steel sheets (1) were heated in the presence of steam-rich atmospheric gas whose dew point can be higher than the temperature of the coated steel sheets (1), the atmospheric gas near the surface of the coated steel sheets (1) could be cooled by the coated steel sheets (1), resulting in dew condensation on the surface of the coated steel sheets (1). Thus, the part of the coated steel sheets (1) with dew condensation could not have contact with steam. Consequently, the part could remain unblackened, hindering uniform blackening of the coating layer. Moreover, the condensed dew could erode the surface of the coated steel sheets (1), followed by white rust formation spoiling the appearance.

To prevent this situation, the first step (S110) in the present invention heats the coated steel sheets (1) in the presence of low-steam gas. This restrains dew formation and thus enables more uniform blackening of the coating layer and more beautiful appearance of the coated steel sheets (1). Therefore, the preference is that the dew point of the atmospheric gas in the first step (S110) does not exceed ordinary temperature. For example, the atmospheric gas in this step can be outside air. The temperature of the coated steel sheets (1) rises with heating. Therefore, if the dew point of the atmospheric gas is lower than the temperature of the coated steel sheets (1) at the start of heating, it usually follows that the dew point of the atmospheric gas is at all times lower than the temperature of the coated steel sheets (1), thus preventing dew formation on the coated steel sheets (1).

In the first step (S110), the coated steel sheets (1) are heated until the surface temperature of the coating layer reaches the temperature at which the coating layer is blackened in contact with steam (hereafter sometimes referred to as "blackening temperature"). For example, the surface temperature of the coated steel sheets (1) placed in the closed container (10) can be measured with a temperature measurement sensor when they are heated to the blackening temperature and above.

Because the coated steel sheets (1) have a large heat capacity, their surface temperature may not rise uniformly. That is, the surface temperature may vary from point to point or from area to area. Therefore, the preference is that the temperature measurement is performed at some points or in some areas on the surface of the coated steel sheets (1), or on the whole surface thereof, and the heating is continued until the lowest temperature in the measurement reaches the blackening temperature. Furthermore, accumulated measurement data make it possible to complete the heating just by setting heating conditions, that is, without temperature measurement.

The blackening temperature can be optionally adjusted depending on the composition (e.g., amounts of Al and Mg in the coating layer) or thickness of the coating layer, the required lightness, and so forth. However, the blackening temperature is preferably 50° C. to 350° C., more preferably 105° C. to 200° C. Temperature above 105° C. can reduce the blackening time. Temperature below 350° C. allows downsizing the blackening device, reducing energy consumption required for heating steam and coated steel sheets (1) in blackening, as well as easily controlling the blackening degree of the coating layer.

There are no special restrictions on the heating method for coated steel sheets (1) if the surface of the coating layer can reach the blackening temperature. For example, the coated steel sheets (1) can be heated in such a manner that a heating device (24) such as a sheath heater installed in the closed container (10) heats the atmospheric gas in the closed container (10) and consequently the coated steel sheets (1). For another example, the coated steel sheets (1) can be heated in a manner such that temperature regulation mechanisms (20, 21) installed on the exterior wall surface of the closed container (10) regulates the temperature in the closed container (10) to heat the coated steel sheets (1). Furthermore, combined use of different means, for example, a heating device (24) such as a sheath heater and temperature regulation mechanisms (20, 21), is possible for the heating.

A stirring device (70) such as a circulation fan (71) can be installed in the closed container (10) to stir the atmospheric gas being heated in the closed container (10). This allows quick, effective and uniform heating of the coated steel sheets (1).

Second Step

The second step (S120) discharges atmospheric gas from the closed container (10) through the gas discharge pipe (31) and thus brings the gas pressure in the closed container (10) to 70 kPa or less. For example, a gas discharge pump or gas discharge pumps (not illustrated) installed outside the closed container (10) can serve to discharge atmospheric gas from the closed container (10), bringing the gas pressure in the closed container (10) to the aforementioned range. The discharge of atmospheric gas in the second step (S120) can be performed once or more than once. In the latter case, the discharge of atmospheric gas and the introduction of low-steam gas through the gas introduction pipe (51) can be repeated to further reduce the amount of the gas components other than steam remaining in the closed container (10).

In this embodiment, the second step (S120) discharges atmospheric gas from the closed container (10) and thus reduces the gas pressure in the closed container (10) so that the gaps between the coated steel sheets (1) can receive a sufficient supply of the steam introduced in the third step (S130) described below. This allows uniform steam treatment of the whole coating layer and most probably uniform blackening thereof. In addition, because of the gas discharge in the second step (S120), the oxygen concentration in the closed container (10) after the introduction of steam in the third step (S130) can be limited to 13% or less. For these reasons, the second step (S120) reduces the gas pressure in the closed container (10) preferably to 70 kPa or less, more preferably to 50 kPa or less.

Third Step

The third step (S130) introduces steam into the closed container (10) and blackens the coating layer of the coated steel sheets (1). Thus, the third step (S130) performs steam treatment for the coated steel sheets (1).

For uniform blackening of the coated steel sheets (1), the preference is that the third step (S130) is performed after measuring the temperature at some points or in some areas on the surface of the coating layer, or on the whole surface thereof, and confirming that the difference between the highest temperature and the lowest temperature in the measurement has gone below 30° C., preferably below 20° C., more preferably below 10° C. This means that the third step (S130) is performed after the whole surface of the coated steel sheets (1) has a uniform temperature. To bring the temperature difference on the surface of the coated steel sheets (1) to the aforementioned range, an intermediate step can be inserted between the first step (S110) and the second step (S120), or between the second step (S120) and the third step (S130), that leaves the coated steel sheets (1) at rest and thus uniformizes the surface temperature of the coating layer.

In the third step (S130), the preference is that the atmospheric temperature in the closed container (10) during steam treatment is 105° C. or more, and the relative humidity in the closed container (10) during steam treatment is 80% to 100%. Atmospheric temperature above 105° C. and relative humidity above 80° % allow quick blackening. In addition, atmospheric temperature above 105° C. allows sufficient blackening of the coating layer. For example, lightness L of the coating layer in the L*a*b* color space can be decreased below 60, preferably below 40, more preferably below 35. Lightness (L* value) of the coating layer surface is measured by spectral reflectance using a spectral colorimeter. Atmospheric temperature above 105° C. does not readily allow water condensation and thus restrains dew formation in the closed container (10) and on the coating layer surface. The atmospheric temperature is preferably 105° C. to 350° C., more preferably 105° C. to 200° C. The relative humidity is preferably 100%. The oxygen concentration in the closed container (10) during steam treatment is preferably 13% or less. Oxygen concentration in this range restrains non-uniform blackening. "Atmospheric temperature" in this specification means the temperature of atmospheric gas in the closed container (10). The atmospheric temperature can be measured with a gas temperature measurement unit (62) installed in the closed container (10).

During the steam treatment in the third step (S130), the inside of the closed container (10) can be heated to maintain the aforementioned atmospheric temperature. There are no special restrictions on the heating method if the atmospheric temperature and relative humidity in the closed container (10) are regulated within the aforementioned ranges. For example, temperature regulation mechanisms (20, 21) or a heating device (24) such as a sheath heater installed in the closed container (10) can be used for the heating. The inside of the closed container (10) can also be heated by heating the steam to be introduced.

Current technology makes it difficult to take a direct measurement of relative humidity, dew point or steam partial pressure itself in an atmosphere exceeding 100° C. In the third step (S130), the atmosphere in the closed container (10) immediately after starting the introduction of steam consists completely of steam. In this case, the relative humidity in the closed container (10) is calculated by dividing the pressure value measured by a pressure gauge (61) in the closed container (10) by the saturated water vapor pressure at the then temperature. However, when the blackening of the coating layer has started, the metal of the coating layer reacts with steam and produces oxides and hydroxides, generating hydrogen gas as a by-product. In this case, the pressure value measured by the pressure gauge (61) is the sum of steam and hydrogen partial pressures. This means that even though steam is introduced to maintain a predefined total pressure, the actual relative humidity may fall below the aforementioned preferable range because the generated hydrogen gas is present in the atmospheric gas inside the closed container (10) during steam treatment.

Thus, Zn reacts with steam and produces Zn oxides or hydroxides, generating hydrogen gas. The reaction can presumably be expressed by formulas 1 and 2. The problem is that the generated hydrogen gas accumulates in the closed container (10), and its coexistence with steam decreases the relative humidity. The inventors believed that because such a phenomenon occurred in the closed container (10), the coating layer could not have sufficient contact with steam, resulting in a non-uniform appearance of the black coated steel sheets (1).

$$Zn+H_2O \rightarrow ZnO+H_2 \quad [1]$$

$$Zn+2H_2O \rightarrow Zn(OH)_2+H_2 \quad [2]$$

To solve the problem described above, that is, to keep the appropriate relative humidity, the third step (S130) in the present invention introduces steam into the closed container (10) and then discharges a certain amount of atmospheric gas from the closed container (10), accompanied by further introduction of steam into the closed container (10). Thus, the third step (S130) can discharge the atmospheric gas containing hydrogen gas generated in the closed container (10) because of the discharge of a certain amount of atmospheric gas with further introduction of steam. Because this construction removes hydrogen gas from the closed container (10), the total pressure in the closed container (10) does not include the pressure of generated hydrogen but consists solely of the pressure of saturated water vapor. Therefore, the right relative humidity can be calculated by dividing the total pressure in the closed container (10) by the saturated water vapor pressure at the then temperature.

If the atmospheric gas is discharged so that no hydrogen gas remains in the closed container (10), the inside of the closed container (10) is a one-component system of water (water vapor), and the total pressure and the temperature in the closed container (10) are not two independent variables. That is, saturated vapor pressure is determined by saturated vapor temperature, or saturated vapor temperature by saturated vapor pressure. An advantage of this condition is easy control: one can control the total pressure or the temperature in the closed container (10) depending on which is better in controllability. Thus, the generated hydrogen gas can be efficiently and reliably discharged without complicating the management of steam treatment in the manufacturing process, and a sufficient supply of steam to the whole of the coated steel sheets (1) enables uniform blackening of the coating layer and manufacturing of more beautiful black coated steel sheets (1).

If the reaction of formula 1 occurs in blackening, 1 mol of steam is consumed to generate 1 mol of hydrogen gas, without change in the gas volume. This means that if the introduction of steam and the discharge of atmospheric gas are controlled so that the total pressure in the closed container (10) stays at a certain level, the generated hydrogen gas is discharged almost completely based on the relationship of formula 3.

Amount of steam introduced into the closed container=Net amount of discharged steam+ Amount of generated hydrogen gas [3]

If the reaction of formula 2 occurs, 2 mol of steam is consumed to generate 1 mol of hydrogen gas, resulting in some decrease in the gas volume and some reduction in the internal pressure of the closed container (10) but still securing the required amount of steam for blackening the coating layer. Thus, even 80% of the set pressure in the closed container (10) allows discharging the generated hydrogen gas and supplying the required amount of steam for blackening the coating layer.

The reaction of formula 1 is exothermic. Therefore, the internal temperature of the closed container (10) during steam treatment may exceed the set blackening temperature. Higher temperature means higher saturated water vapor pressure. In this case, depending on the internal temperature of the closed container (10), the pressure can be raised to a maximum of 120% to supply a sufficient amount of steam for blackening the coating layer.

Thus, the internal pressure of the closed container (10) during steam treatment is preferably controlled in a range of 80% to 120% of the predefined pressure.

The discharge of atmospheric gas and the introduction of steam can be performed continuously throughout the third step (S130). Alternatively, they can be performed once or more than once at certain intervals.

The atmospheric gas in the closed container (10) can be stirred by a stirring unit (70) during the blackening after or while introducing steam into the closed container (10) to prevent non-uniform blackening of the coated steel sheets (1).

The time of steam treatment can be optionally adjusted depending on the composition (e.g., amounts of Al and Mg in the coating layer) or thickness of the coating layer, the required lightness, and so forth. However, the time of steam treatment is preferably 24 hours or so.

Figure 2:
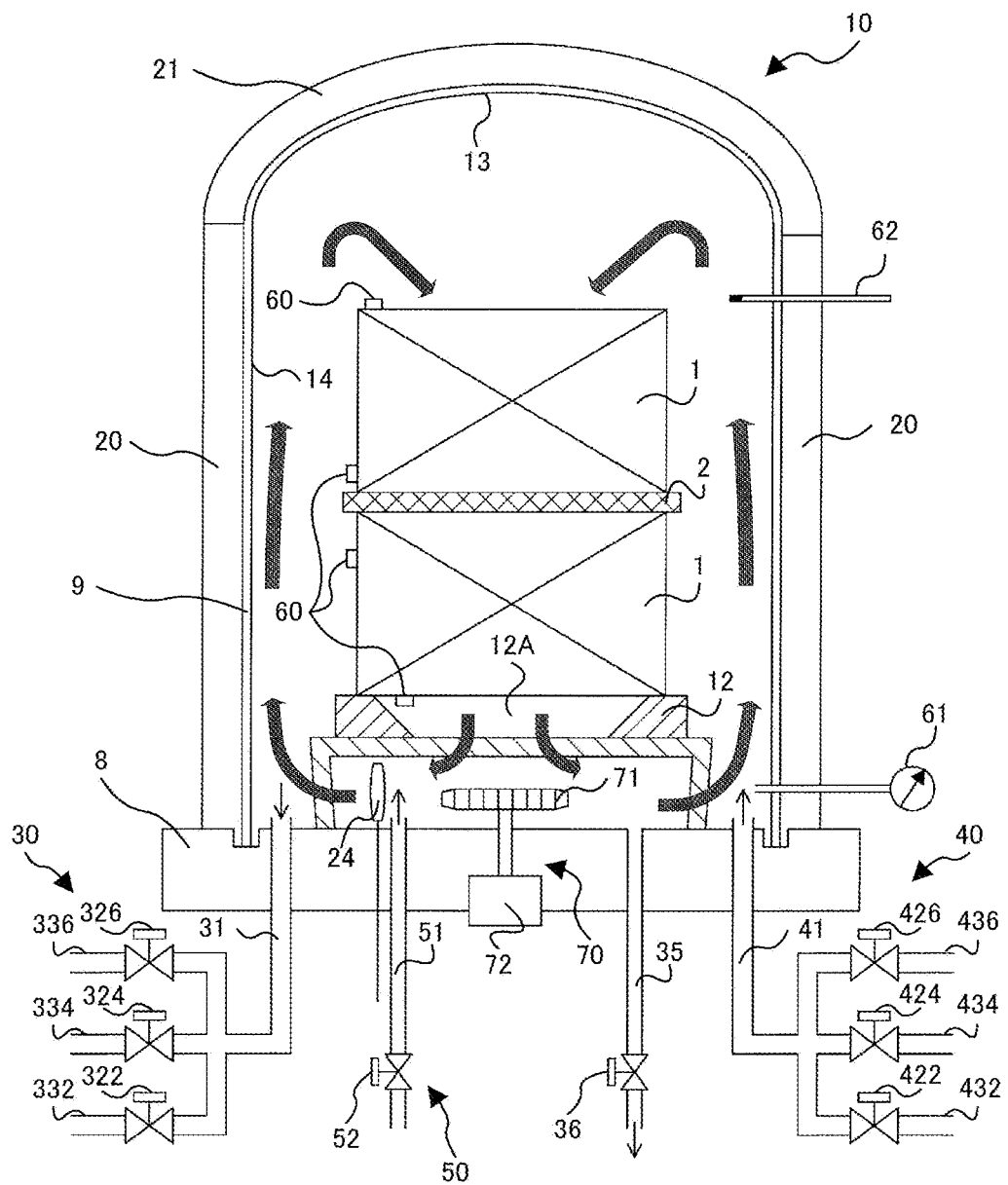
FIG. 2 is a schematic diagram of the device for manufacturing black coated steel sheets according to the present invention.

In this embodiment, the amount of steam to be introduced into the closed container (10) and the amount of atmospheric gas to be discharged from the closed container (10) are adjustable. As shown in FIG. 2, the amount of steam in the closed container (10) for blackening the coating layer is regulated by a steam introduction regulation mechanism (40) that adjusts the amount of steam to be introduced into the closed container (10), and a gas discharge regulation mechanism (30) that adjusts the amount of atmospheric gas to be discharged from the closed container (10), to maintain a predefined pressure. More specifically, these regulation mechanisms (30, 40) are provided with pipes with different nominal diameters (20 A, 25 A and 80 A), and these pipes are provided with gas discharge valves (322, 324, 326) (all hereafter referred to as "gas discharge valves (32)") and steam supply valves (422, 424, 426) (all hereafter referred to as "steam supply valves (42)"), which are opened and closed by a control unit (90) described below to adjust the amount of steam to be introduced and the amount of atmospheric gas to be discharged and thus maintain the appropriate internal pressure of the closed container (10).

In this embodiment, the amount of steam in the closed container (10) is adjusted as follows: The required amount of steam for blackening is determined by the surface area of the coated steel sheets (1) placed in the closed container (10). To secure the required amount of steam in the closed container (10), the gas discharge valves (32) of the gas discharge regulation mechanism (30) have predefined opening positions, while the steam supply valves (42) of the steam introduction regulation mechanism (40) have variably controlled opening positions. This setting is not the only possible setting. It is possible that the steam supply valves (42) of the steam introduction regulation mechanism (40) have predefined opening positions, while the gas discharge valves (32) of the gas discharge regulation mechanism (30) have variably controlled opening positions. It is also possible that both the gas discharge valves (32) of the gas discharge regulation mechanism (30) and the steam supply valves (42) of the steam introduction regulation mechanism (40) have timely controlled opening positions.

Because the reaction of formula 1 is exothermic, the temperature of the coated steel sheets (1) may rise in the course of blackening. If the internal pressure of the closed container (10) continues to remain at the predefined level in that situation, the coated steel sheets (1) experience decreased relative humidity, which is unfavorable for quick blackening. The solution here is that the gas discharge valves (32) of the gas discharge regulation mechanism (30) and/or the steam supply valves (42) of the steam introduction regulation mechanism (40) have their opening positions adjusted to introduce a larger amount of steam into the closed container (10) while maintaining the internal pressure of the closed container (10) at the predefined level, thus raising the relative humidity for the coated steel sheets (1) during blackening.

Fourth Step

The fourth step (S140) returns the internal pressure of the closed container (10) to the outside air pressure level and then discharges atmospheric gas from the closed container (10) to bring the gas pressure in the closed container (10) to 70 kPa or less. For example, the internal pressure of the closed container (10) can be returned to the outside air pressure level by opening an outside air admittance valve (not illustrated) provided to the closed container (10). The gas pressure in the closed container (10) can be brought to 70 kPa or less by using a gas discharge pump or gas discharge pumps (not illustrated) installed outside the closed container (10) to discharge atmospheric gas from the closed container (10) through the gas discharge pipe (31).

If the fifth step (S150) described below cooled the coated steel sheets (1) when steam remains in the closed container (10), the steam remaining in the gaps between the coated steel sheets (1) or elsewhere might condense, resulting in dew formation on the surface of the coated steel sheets (1) or in the closed container (10). Further, the dew formation, or the presence of water, on the surface of the coated steel sheets (1) might lead to non-uniform blackening of the coated steel sheets (1). Therefore, the fourth step (S140) returns the internal pressure of the closed container (10) to the outside air pressure level and then discharges atmospheric gas from the closed container (10), thus reducing the amount of steam in the closed container (10). This prevents the problem described above when the fifth step (S150) cools the coated steel sheets (1). Considering the above circumstances, the fourth step (S140) preferably reduces the gas pressure in the closed container (10) to 70 kPa or less, more preferably to 30 kPa or less.

Fifth Step

The fifth step (S150) cools the coated steel sheets (1) by introducing gas (low-steam gas), whose dew point is lower than the temperature of the coated steel sheets (1) at all times, into the closed container (10) through the gas introduction pipe (51). The gas to be introduced in the fifth step (S150) is preferably unheated, but if necessary, can be heated to the extent that its temperature does not reach the temperature of the atmosphere in the closed container (10).

For example, the low-steam gas to be introduced in the fifth step (S150) can be outside air, nitrogen gas or inert gas. In consideration of workability, the preference is to admit outside air into the closed container (10).

In addition, if necessary, the temperature of the atmospheric gas in the closed container (10) can be lowered using temperature regulation mechanisms (20, 21) to cool the coated steel sheets (1).

A stirring device (70) such as a circulation fan (71) can be installed in the closed container (10) to stir the atmospheric gas being cooled in the closed container (10). This allows quick, effective and uniform cooling of the coated steel sheets (1).

Device for Manufacturing Black Coated Steel Sheets

Construction of the Device

Figure 3:
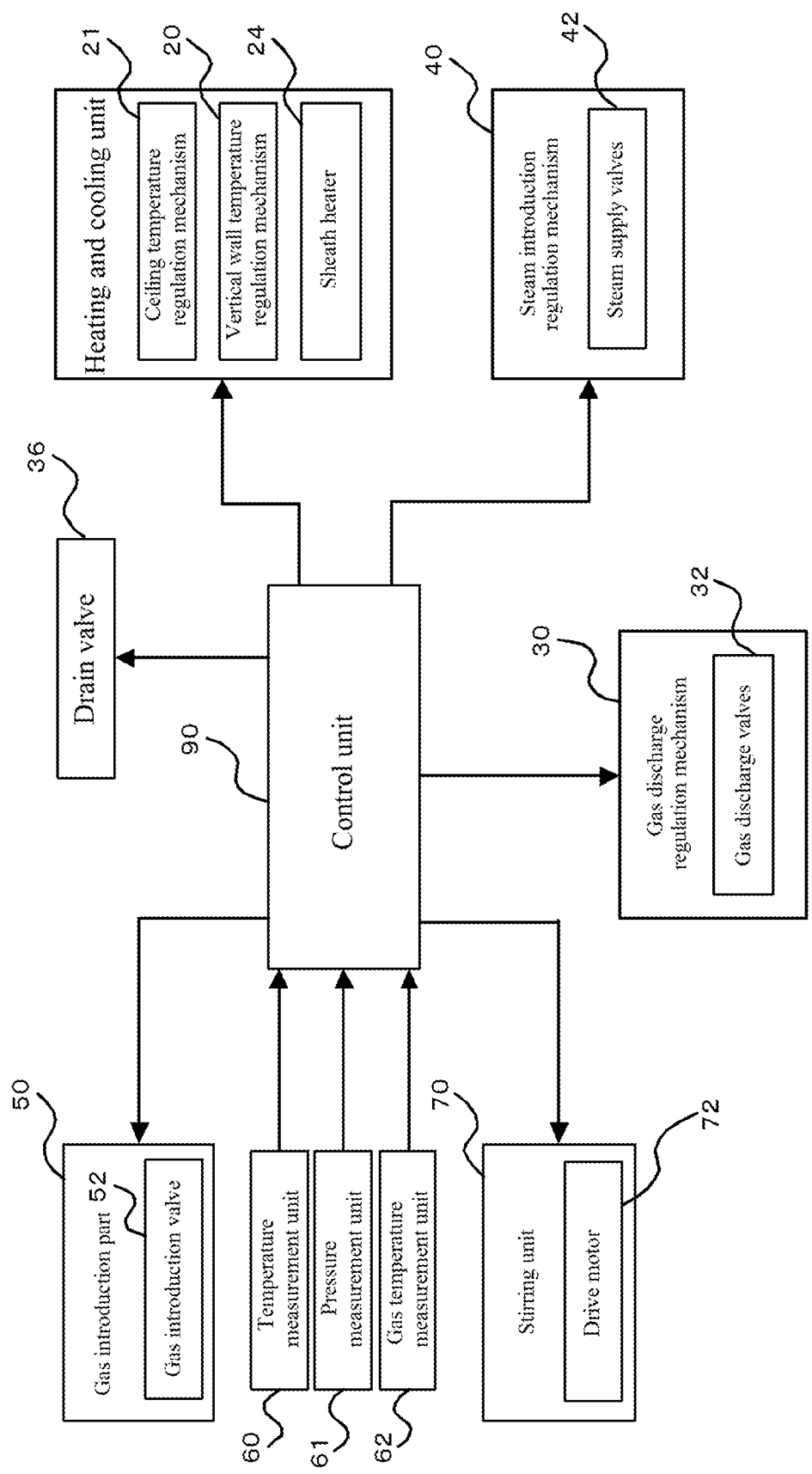
FIG. 3 shows the control system of the device for manufacturing black coated steel sheets according to the present invention.

The device for manufacturing black coated steel sheets according to the present invention (hereafter sometimes referred to as "the device according to the present invention"), as shown in a schematic cross-sectional view of an example of the device in FIG. 2, comprises a closed container (10) that has a placement part (12) for placing coated steel sheets (1) in a removable manner, a ceiling temperature regulation mechanism (21), a vertical wall temperature regulation mechanism (20) and a heating device (24) such as a sheath heater that heat (or cool) the inside of the closed container (10), a gas discharge regulation mechanism (30) that discharges atmospheric gas from the closed container (10), and a steam introduction regulation mechanism (40) that introduces steam into the closed container (10). In addition, the device according to the present invention may have a gas introduction part (50) for introducing gas, including outside air, into the closed container (10), and an outside air admittance valve (not illustrated) for returning the internal pressure of the closed container (10) to the outside air pressure level. Furthermore, the device according to the present invention may have a temperature measurement unit (60) that measures the temperature of the coated steel sheets (1), a pressure measurement unit (61) that measures the internal pressure of the closed container (10), a gas temperature measurement unit (62) that measures the temperature of the atmospheric gas, and a stirring unit (70) such as a circulation fan (71) that stirs the atmospheric gas in the closed container (10). As shown in FIG. 3, besides temperature regulation mechanisms (20, 21), a heating device (24) such as a sheath heater, a gas discharge regulation mechanism (30), a steam introduction regulation mechanism (40), a gas introduction part (50) and a stirring unit (70), the device according to the present invention may have a control unit (90) that controls the opening and closing of valves in manufacturing black coated steel sheets (1). If the device according to the present invention has a drain pipe (35) and a drain valve (36), the control unit (90) can control the drain valve (36) to drain water from the device.

Below is a detailed description of an example of the device according to the present invention with reference to FIG. 2.

The closed container (10) has a bottom frame (8) and an upper cover (9). The bottom frame (8) has a placement part (12) for placing coated steel sheets (1). The upper cover (9) has a ceiling (13) in the form of a dome and a vertical wall (14) in the form of a cylinder. The upper cover (9) is bottomless. There are two separate temperature regulation mechanisms installed on the exterior wall of the closed container (10): a ceiling temperature regulation mechanism (21) and a vertical wall temperature regulation mechanism (20). The reason for installing two separate temperature regulation mechanisms is as follows: If the inside of the closed container (10) was cooled in such a manner that the ceiling temperature regulation mechanism (21) cools the ceiling (13) of the upper cover (9), the inner surface of the ceiling (13) might be subjected to dew formation, and the dew might drop on the coated steel sheets (1) to spoil their appearance. Therefore, the inside of the closed container (10) is cooled by the vertical wall temperature regulation mechanism (20), not by the ceiling temperature regulation mechanism (21). The bottom frame (8) and the upper cover (9) create airtightness, and the closed container (10) has strength sufficient to withstand the pressure increase and decrease inside the closed container (10) caused by introducing steam and discharging atmospheric gas as well as heating and cooling.

The bottom frame (8) is connected with a steam supply pipe (41) for introducing steam from a steam supply source, a gas discharge pipe (31) for discharging atmospheric gas and steam from the closed container (10), a gas introduction pipe (51) and a drain pipe (35). These pipes have valves. When the valves are shut, the container (10) is in a closed state.

The coated steel sheets (1) are placed in the placement part (12) installed on the bottom frame (8). The coated steel sheets (1) can be stacked with spacers (2) between them. As shown in FIG. 2, the placement part (12) has through holes (12A) that expel the atmospheric gas flowing from the upper side to the lower side of the coated steel sheets (1) toward a circulation fan (71). Because of this construction, the gas in the closed container (10) passes through the gaps between the metallic bands of the coated steel sheets (1) for circulation. Thus, the coated steel sheets (1) have more uniform contact with the atmospheric gas.

The gas discharge mechanism (30) has a gas discharge pipe (31), gas discharge valves (32) and a gas discharge pump or gas discharge pumps (not illustrated). The gas discharge pipe (31) passes through the bottom frame (8) to connect the inside of the closed container (10) to the outside thereof. For example, the atmospheric gas (low-steam gas, etc.) in the closed container (10), or the atmospheric gas (steam gas, generated hydrogen gas, etc.) in the closed container (10) after steam treatment, is discharged to the outside through the gas discharge pipe (31) with the help of the gas discharge pump(s) (not illustrated). In this embodiment, as shown in FIG. 2, the gas discharge pipe (31) is connected to pipes (332, 334, 336) with different nominal diameters to adjust the amount of steam in the closed container (10) during steam treatment. Each pipe has a gas discharge valve (32). For example, the valves (32) of three pipes (332, 334, 336) with nominal diameters of 20 A, 25 A and 80 A can be opened and closed by a control unit (90) described below for accurate and precise gas discharge regulation based on the required amount of steam in the closed container (10). This embodiment is not the only one possible, but the number and nominal diameters of the pipes (332, 334, 336) can be altered for specific needs. In the second and fourth steps described above, the gas discharge regulation mechanism (30) can discharge atmospheric gas so as to bring the gas pressure in the closed container (10) to 70 kPa or less.

The drain pipe (35) passes through the bottom frame (8) to connect the inside of the closed container (10) to the outside thereof. The fluid (dew, etc.) in the closed container (10) is drained to the outside through the drain pipe (35).

The steam introduction regulation mechanism (40) has a steam supply pipe (41) and steam supply valves (42), which serve to adjust the amount of steam to be supplied to the closed container (10). When the steam introduction regulation mechanism (40) does not supply steam, the steam supply valves (42) are shut to block the supply of steam to the closed container (10) through the steam supply pipe (41). In the device for manufacturing black coated steel sheets according to the present invention, as shown in FIG. 2, the steam supply pipe (41) is connected to pipes (432, 434, 436) with different nominal diameters. Each pipe has a steam supply valve (42). For example, the valves (42) of three pipes (432, 434, 436) with nominal diameters of 20 A, 25 A and 80 A can be opened and closed by control for accurate and precise steam introduction regulation based on the required amount of steam in the closed container (10). This is not the only possible embodiment, but the number and nominal diameters of the pipes (432, 434, 436) can be altered for specific needs.

The gas introduction part (50) has a gas introduction pipe (51) and a gas introduction valve (52). The gas introduction pipe (51) passes through the bottom frame (8) to connect the inside of the closed container (10) to the outside thereof, or to a gas supply source (not illustrated). For example, the gas introduction part (50) can introduce low-steam gas into the closed container (10) in the first and fifth steps (S110, S150).

The temperature measurement unit (60) consists of temperature sensors set in contact with different areas on the surface of the coated steel sheets (1) to measure the temperature of the coated steel sheets (1), for example, using thermocouples. If the coated steel sheets (1) are in coil form, thermocouples can be inserted between the coiled sheets.

The pressure measurement unit (61) measures the internal pressure of the closed container (10). This unit has a pressure gauge that can measure gauge pressure in the first, third and fifth steps (S110, S130, S150), and a vacuum gauge that can measure pressure below the outside air pressure level in the second and fourth steps (S120, S140). These gauges can also be used, switching between them.

The gas temperature measurement unit (62) has a temperature sensor that measures the temperature of atmospheric gas in the closed container (10). For example, a thermocouple can be used as the temperature sensor. It is also possible to place sensors at some points in the closed container (10), appropriately switching among the sensors.

The stirring unit (70) has a circulation fan (71) positioned on the bottom frame (8), and a drive motor (72) that rotates the circulation fan (71). When the drive motor (72) rotates the circulation fan (71), the atmospheric gas in the closed container (10) during steam treatment, as shown by the arrows in FIG. 2, flows from the lateral portion of the placement part (12) into the gap between this portion and the interior wall of the closed container (10), passes along the outer peripheral surface of the coated steel sheets (1), and then flows into the gaps between the metallic bands from the upper side of the coated steel sheets (1). After that, the atmospheric gas flows from the lower side of the coated steel sheets (1) into the inside of the placement part (12) and again flows from the lateral portion of the placement part (12) into the gap between this portion and the interior wall of the closed container (10) for circulation in the closed container (10). Thus, the atmospheric gas in the closed container (10) during steam treatment is stirred. The stirring unit (70) can be used during steam treatment as well as in the heating and cooling of the coated steel sheets (1).

System for Manufacturing Black Coated Steel Sheets

Below is a detailed description of an exemplary operation of the device for manufacturing black coated steel sheets according to the present invention and its control system with reference to FIG. 3 showing a working example of the present invention.

After the coated steel sheets (1) are placed in the placement part (12) and the container (10) is closed, the control unit (90) controls the operations of the temperature regulation mechanisms (20, 21), the heating device (24) such as a sheath heater, the gas discharge regulation mechanism (30), the steam introduction regulation mechanism (40), the gas introduction part (50) and the stirring unit (70), as described below.

In the first step, which heats the coated steel sheets (1), the control unit (90) uses the temperature regulation mechanisms (20, 21) and/or the heating device (24) such as a sheath heater to heat the inside of the closed container (10) and consequently the coated steel sheets (1) in the presence of low-steam gas. In the heating, the control unit (90) operates the heating means mentioned above until the temperature of the coating layer measured by the temperature measurement unit (60) reaches the blackening temperature. In this embodiment, the target blackening temperature is 105° C. During the heating, if necessary, the circulation fan (71) can be rotated by control to circulate the atmospheric gas in the closed container (10).

In the second step, the control unit (90) opens the gas discharge valve(s) (32) of the gas discharge regulation mechanism (30) and activates the gas discharge pump(s) (not illustrated) to discharge atmospheric gas from the closed container (10) through the gas discharge pipe (31) until the gas pressure in the closed container (10) decreases to 70 kPa or less. When the gas pressure in the closed container (10) has decreased to 70 kPa or less, the control unit (90) shuts the gas discharge valve(s) (32). Before opening the gas discharge valve(s) (32) of the gas discharge regulation mechanism (30) and activating the gas discharge pump(s), it is also possible to open an outside air admittance valve (not illustrated) to return the internal pressure of the closed container (10) to the outside air pressure level.

The third step begins when the gas pressure in the closed container (10) has reached the aforementioned range. In this step, the control unit (90) opens the steam supply valve(s) (42) of the steam introduction regulation mechanism (40) to supply steam to the closed container (10) from a steam supply source. Thus, steam is introduced into the closed container (10) through the steam supply pipe (41). In the steam introduction regulation mechanism (40), the steam supply valve(s) (42) can be opened when the control unit (90) recognizes that the difference between the highest temperature and the lowest temperature, which are measured by the temperature measurement unit (60) consisting of temperature sensors, has reached the aforementioned predefined range. If necessary, the steam to be introduced can be heated with a steam heater (not illustrated).

If necessary, the control unit (90) can also activate the drive motor (72) of the stirring unit (70) and thus rotate the circulation fan (71) to stir and circulate the atmospheric gas containing steam in the closed container (10).

In this embodiment, the control unit (90) controls the steam introduction regulation mechanism (40) that adjusts the amount of steam to be introduced into the closed container (10), and the gas discharge regulation mechanism (30) that adjusts the amount of atmospheric gas to be discharged from the closed container (10), thereby continuously adjusting the amount of steam in the closed container (10) for blackening the coating layer, appropriately removing the hydrogen gas generated in the closed container (10), and maintaining the appropriate relative humidity (the target value is 100%). Thus, the control unit (90) opens and closes the gas discharge valves (32) and the steam supply valves (42) provided to the pipes with different nominal diameters of the regulation mechanisms described above (30, 40), adjusting the amount of steam to be introduced and the amount of atmospheric gas to be discharged.

When the control unit (90) adjusts the amount of steam in the closed container (10), this is determined by the required amount of steam for blackening that depends on the surface area of the coated steel sheets placed in the closed container (10). Therefore, the control unit (90) fixes the opening positions of the gas discharge valves (32) of the gas discharge regulation mechanism (30) to predefined opening positions while variably controlling the opening positions of the steam supply valves (42) of the steam introduction regulation mechanism (40). It is also possible to fix the opening positions of the steam supply valves (42) of the steam introduction regulation mechanism (40) to predefined opening positions while variably controlling the opening positions of the gas discharge valves (32) of the gas discharge regulation mechanism (30), or to timely control both the opening positions of the gas discharge valves (32) of the gas discharge regulation mechanism (30) and the opening positions of the steam supply valves (42) of the gas introduction regulation mechanism (40).

When the control unit (90) controls the introduction of steam into the closed container (10) and the discharge of atmospheric gas (steam, hydrogen gas generated in the reaction, etc.) from the closed container (10), the control unit (90) continuously monitors the measurement data of the pressure measurement unit (61) to maintain the required pressure in the closed container (10). Thus, the closed container (10) can secure the required amount of steam for steam treatment. In this embodiment, the internal pressure of the closed container (10) during steam treatment is set at 121 kPa for the control unit (90). This pressure is the saturated water vapor pressure corresponding to a temperature of 105° C. in the closed container (10). The internal pressure of the closed container (10) can be controlled by setting upper and lower limits on the measurement data of the pressure measurement unit (61) and then controlling the amount of steam to be introduced and the amount of steam to be discharged when those predefined threshold values are measured, or by timely controlling the aforementioned amounts to maintain a certain predefined pressure at all times.

After introducing steam and performing the blackening treatment, the control unit (90) shuts the steam supply valve(s) (42) of the steam introduction regulation mechanism (40) and thus blocks the passing of gas through the steam supply pipe (41) between the inside and the outside of the closed container (10). After that, the control unit (90) opens the gas discharge valve(s) (32) of the gas discharge regulation mechanism (30) and activates the gas discharge pump(s) (not illustrated) to discharge atmospheric gas from the closed container (10). Thus, the gas pressure in the closed container (10) is reduced to 70 kPa or less. When the gas pressure in the closed container (10) has decreased to 70 kPa or less, the control unit (90) shuts the gas discharge valve(s) (32) of the gas discharge regulation mechanism (30) and thus blocks the passing of gas through the gas discharge pipe (31) between the inside and the outside of the closed container (10).

When the gas pressure in the closed container (10) has reached the aforementioned range, the fifth step begins. In the fifth step, the control unit (90) opens the gas introduction valve (52) of the gas introduction part (50) and thus introduces gas, whose dew point is lower than the temperature of the coated steel sheets (1) at all times, into the closed container (10) through the gas introduction pipe (51). In this embodiment, outside air is introduced until the gas pressure in the closed container (10) reaches 101 kPa (roughly equal to the outside air pressure level). The gas (outside air in this embodiment) thus introduced cools the coated steel sheets (1).

At any time, including when the coated steel sheets (1) are cooled, the control unit (90) can open the drain valve (36) to drain dew and the like from the closed container (10). The control of the drain valve (36) can be performed once or more than once during the operation of the device according to the present invention, or the drain valve (36) can remain closed throughout the operation of the device if the coating layer is satisfactorily blackened.

Effects

The method according to the present invention discharges the hydrogen gas generated during the steam treatment of coated steel sheets efficiently and reliably without complicating the management of steam treatment in the manufacturing process, and supplies sufficient steam to the whole of the coated steel sheets, allowing uniform blackening of the coating layer and the manufacturing of more beautiful black coated steel sheets.

INDUSTRIAL APPLICABILITY

The method according to the present invention appropriately discharges the hydrogen gas generated during the steam treatment of coated steel sheets and appropriately controls the amount of steam to be supplied for the treatment, which allows manufacturing of more uniformly blackened and therefore more beautiful coated steel sheets, leading to increased popularity of black coated steel sheets.

REFERENCE SIGNS LIST

1 Coated steel sheets
10 Closed container

What is claimed is:

1. A method for manufacturing black coated steel sheets, which brings Zn—Al—Mg alloy coated steel sheets into contact with steam in a closed container, wherein said closed container is configured to be able to variably control the amount of steam flowing into said closed container and the amount of atmospheric gas flowing out of said closed container, said method includes:

while maintaining the pressure in said closed container, bringing said Zn—Al—Mg alloy coated steel sheets into contact with the steam introduced into said closed container by carrying out introducing the steam into said closed container and discharging the atmospheric gas from said closed container in parallel such that hydrogen gas generated in said closed container does not remain in said closed container.

2. A method for manufacturing black coated steel sheets, which brings Zn—Al—Mg alloy coated steel sheets into contact with steam in a closed container, wherein said closed container is configured to be able to variably control at least one of the amount of steam introduced into said closed container and the amount of steam discharged from said closed container, said method includes:

while maintaining the pressure in said closed container at 80% to 120% of a predetermined value, variably controlling at least one of the amount of steam flowing into said closed container and the amount of atmospheric gas flowing out of said closed container, bringing said Zn—Al—Mg alloy coated steel sheets into contact with the steam introduced into said closed container by carrying out introducing the steam into said closed container and discharging the atmospheric gas from said closed container in parallel such that hydrogen gas generated in said closed container does not remain in said closed container.

* * * * *